United States Patent

Saichi et al.

[11] Patent Number: 5,872,682
[45] Date of Patent: Feb. 16, 1999

[54] DISC DRIVE MOTOR

[75] Inventors: Masayoshi Saichi; Mitsuru Ide, both of Nagano, Japan

[73] Assignee: Sankyo Seiki Mfg. Co., Ltd., Nagano-ken, Japan

[21] Appl. No.: 972,697

[22] Filed: Nov. 18, 1997

Related U.S. Application Data

[63] Continuation of Ser. No. 534,542, Sep. 27, 1995, abandoned.

[30] Foreign Application Priority Data

Sep. 30, 1994 [JP] Japan .................................. 6-237125

[51] Int. Cl.$^6$ ............................................... G11B 17/028
[52] U.S. Cl. ...................................... 360/99.12; 360/98.08
[58] Field of Search .............................. 360/98.08, 99.12, 360/99.05, 97.01

[56] References Cited

U.S. PATENT DOCUMENTS

| | | | |
|---|---|---|---|
| 4,949,000 | 8/1990 | Petersen | 310/179 |
| 4,965,476 | 10/1990 | Lin | 360/98.07 X |
| 5,278,709 | 1/1994 | Thornton et al. | 360/97.01 |
| 5,295,030 | 3/1994 | Tafreshi | 360/99.12 |
| 5,333,080 | 7/1994 | Ridinger et al. | 360/99.12 |
| 5,517,374 | 5/1996 | Katakura et al. | 360/98.07 |
| 5,528,434 | 6/1996 | Bronshvatch et al. | 360/98.08 |

*Primary Examiner*—William J. Klimowicz
*Attorney, Agent, or Firm*—McAulay Nissen Goldberg Kiel & Hand, LLP

[57] ABSTRACT

A disc drive motor comprises a fixed a fixed shaft, a ball bearing fitted on the fixed shaft, a cylindrical hub rotatably supported by the ball bearing, a clamper for fixing a disc to the hub and a cap secured to the hub so as to cover one open end of an opening portion of the hub. The cap includes an engaging element formed as part of the cap for engaging with a rotation stopper jig in order to stop rotation of the hub when clamping the discs. The engaging element includes a protruding or recessed portion of the cap. The engaging may be in the form of a polygon or, in particular, a regular polygon.

4 Claims, 3 Drawing Sheets

DISC DRIVE MOTOR

This application is a continuation of U.S. application Ser. No. 08/534,542, filed Sep. 27, 1995 now abandoned.

BACKGROUND OF THE INVENTION a) Field of the Invention

The present invention relates to a disc drive motor having a structure wherein a disc is mounted on a hub and the disc is fixed by a clamper, whereupon the disc is rotated.

b) Description of the Related Art

A disc drive motor for rotating an information recording medium is used in an electronic device such as, for example, a hard disc drive device. Such an electronic device has the following structure. That is, a plurality of discs having information recorded therein are stacked onto a hub with a prescribed space provided between them. Such discs are fixed by means of a clamper, and the hub and the discs are rotated by the disc drive motor. Meanwhile, a magnetic head is disposed facing a recorded surface of the disc. This magnetic head is positioned over a designated track of the relevant disc by a carriage on which it is loaded to thereby write or read information into or from the disc.

The basic structure of the above-mentioned conventional disc drive motor is disclosed in U.S. Pat. No. 4,965,476.

In U.S. Pat. No. 4,965,476, FIG. 3, the outer ring 130 of the ball bearing 126, is fitted and fixed to an inner peripheral surface of the inside opening of the hub 134 and the cap 150 is fixed to the hub 134 in such a manner as to cover one open end of the inside opening of the hub 134. Namely, the cap 150 closes a space located on the upper side of the fixed shaft 112. Accordingly, the space becomes a completely closed space as a result of the use of the cap 150, whereby splashing of the oil mist is prevented. As a result, substances doing harm to the discs such as oil mist which are generated from inside the ball bearing are checked and thus are effectively prevented from splashing upward, whereby the disc drive motor can have high reliability.

In the disclosure of U.S. Pat. No. 4,965,476, FIG. 3, on the hub 134 of the above-mentioned disc drive motor, there are mounted discs 1401, 1402 such as magnetic discs together with spacers 141 interposed between them so that the discs 1401, 1402 are sequentially stacked upward from the flange portion of the hub 134. And in order to fix these discs 1401, 1402, the screws are screwed into the screw holes of the upper end surface of the hub 134, and then the discs 1401, 1402 are fixed while being urged with the clamper 142. As mentioned above, the discs 1401, 1402 are reliably fixed to the hub 134 and thus are rotated without disengaging from the rotation of the motor.

When the discs 1401, 1402 are placed on the flange portion of the hub 134 of the above-mentioned disc drive motor and are fixed with the clamper 142, the following problem arises. Namely, since the hub 134 is rotatably supported by the ball bearings 1261 and 1262, the hub 134 is inconveniently rotated when the clamper 142 is to be fastened by the screws. Thus, there is the problem that the fixing operation is very difficult to perform.

As a countermeasure against this, in order to prevent such inconvenient rotation of the hub 134, as illustrated in FIG. 5 herein, jig engagement holes 30 are formed in the upper end surface of the hub 134 separately from the screw holes 19, to thereby prevent the rotation of the hub 134 by engaging a fixing jig, not illustrated, with one of these jig engagement holes 30. Thus, the clamper 142 is fastened by screws in this state.

In this technique, however, it is necessary that the jig engagement holes 30 with which a jig is engaged be formed at least in the upper end surface 23 of the hub 134. Since these holes are formed by cutting, a significant length of work time was needed. This caused an increase in the parts cost of the hub 134.

OBJECT AND SUMMARY OF THE INVENTION

In view of the above, the object of the present invention is to provide a disc drive motor which enables the manufacture of the hub at low cost without providing the above-mentioned jig engagement holes in the hub and which, when fixing the discs to the hub, enables the performance of the fixing operation of the clamper while easily stopping the rotation of the hub.

In accordance with the invention, a disc drive motor comprises a fixed shaft, a ball bearing fitted onto the fixed shaft, a cylindrical hub rotatably supported by the ball bearing, a cylindrical hub rotatably supported by the ball bearing, a clamper for fixing a disc to the hub and a cap secured to the hub so as to cover one open end of an opening portion of the hub. The cap includes engagement means formed in the cap for engaging with a rotation stopper jig in order to stop rotation of the hub when clamping the discs.

For a better understanding of the present invention, reference is made to the following description and accompanying drawings while the scope of the invention will be pointed out in the appended claims.

DESCRIPTION OF THE PREFERRED EMBODIMENTS

A disc drive motor according to an embodiment of the present invention will be described hereafter with reference to FIGS. 1 through 4.

Figure 1:
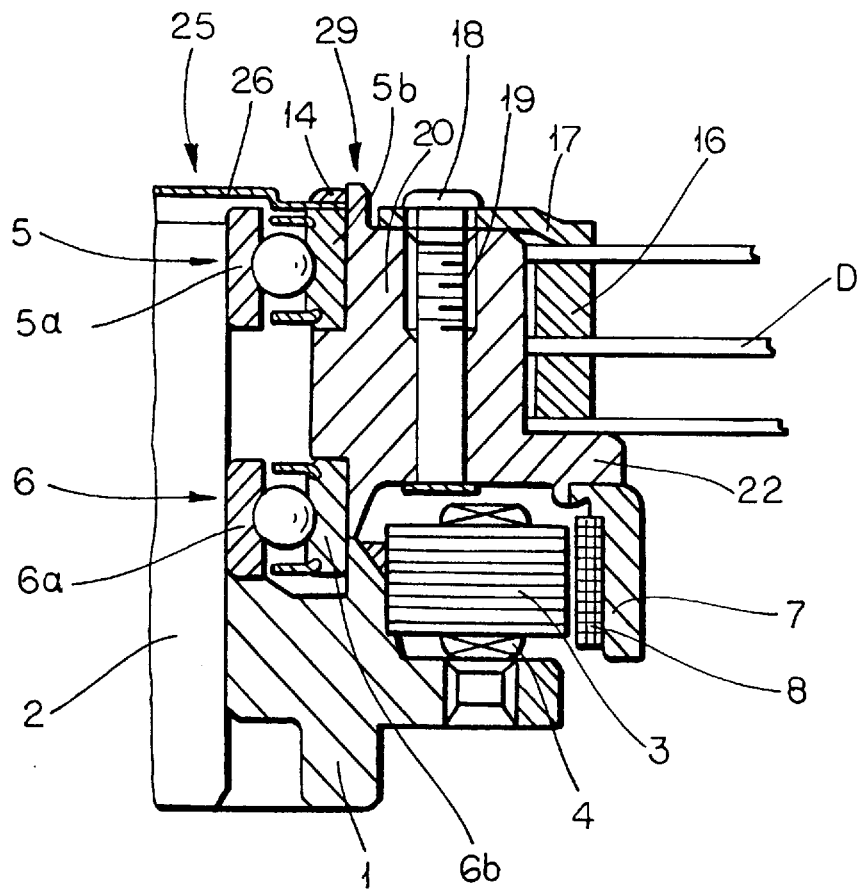
FIG. 1 is a sectional view illustrating a disc drive motor according to an embodiment of the present invention.
Figure 2:
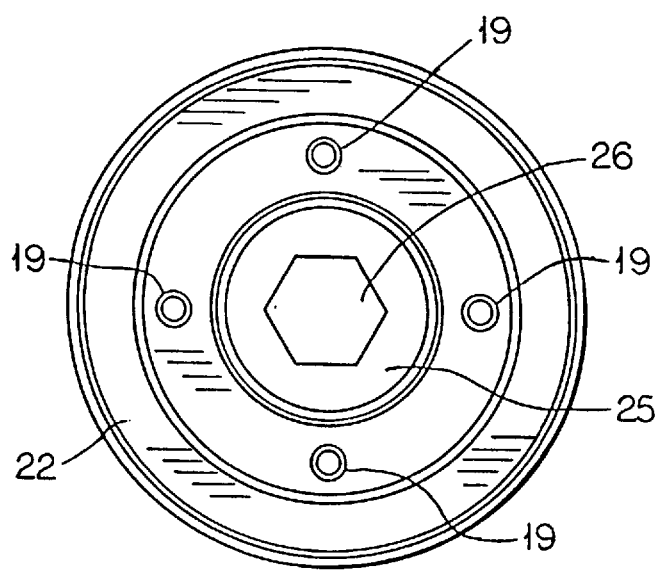
FIG. 2 is a plan view illustrating the disc drive motor according to the embodiment of the present invention.

FIG. 1 is a half sectional view illustrating a disc drive motor according to an embodiment of the present invention and FIG. 2 is a plan view illustrating the whole thereof. In FIG. 1, reference numeral 1 denotes a frame mounted with respect to a hard disc drive device, at a center of which a fixed shaft 2 is secured to the frame 1. Inner rings 5a and 6a of ball bearings 5 and 6 are fitted to the fixed shaft 2 at a suitable interval therebetween. Also, to the frame 1 there is fixed a stator core 3 having a plurality of radially projecting salient poles each having a coil 4 wound therearound. Outer rings 5b and 6b of the ball bearings 5 and 6 are fitted and fixed to an inner opening of a cylindrical hub 20. Accordingly, the hub 20 is rotatably supported on the fixed shaft 2 by means of the ball bearings 5 and 6. The hub 20 has on an outer peripheral portion of its lower end side a flange portion 22 on which discs are loaded. A cylindrical yoke 7 is secured to a lower end surface of the flange portion 22. A ring-like driving magnet 8 is mounted on an inner peripheral surface of the yoke 7 and this driving magnet 8 is located opposing the salient poles of the stator core 3 with a prescribed gap therebetween. A plurality of discs D, serving as information recording media, such as, for example, magnetic discs, are placed, with spacers interposed between them, on an upper end surface of the flange portion 22 of the hub 20. These discs are fixed by means of a clamper 17. The clamper 17 is fixed by means of screws 19 each screw engaged with a screw hole 19 formed in the hub 20.

A cap 25 is fixed to one open end 29 of an inside opening of the hub 20 and arranged to rotate integrally with the hub 20. The cap 25 is prepared by press-cutting a corrosion-resistant metal plate by press working or the like in conformity with the diameter of the inside opening of the hub 20. At the center of the cap 25, there is formed a protruding portion 26 as later described. This protruding portion 26 is formed so that the cap 25 does not interfere with the forward end of the fixed shaft 2 and the inner ring 5a of the ball bearing 5. An outer peripheral edge portion of the cap 25 is fitted to the inside opening of the hub 20 and secured thereto by use of a bonding agent 14 such as an adhesive agent in a state abutting an upper end surface of the outer ring 5b of the ball bearing 5.

The cap 25, which is one of the constituent elements the present invention, will be described in detail. Since the cap 11 of the conventional techniques is formed, at its central part, with the protruding portion 12 shaped like a true circle having the same center as a center of rotation of the cap 11, the cap 11 is inconveniently rotated even when the protruding portion 12 thereof is gripped with the use of a jig. In contrast, the cap 25 according to the present invention has a protruding portion 26 or recessed portion 27 of a shape other than a true circle having the same center as the center of rotation of the cap 25. A state wherein this cap 25 has been incorporated into the disc drive motor is illustrated in FIG. 2 as a plan view. Also, various modes of embodiments of the cap 25 as a single member are illustrated in FIG. 4 as perspective views.

Figure 4A:
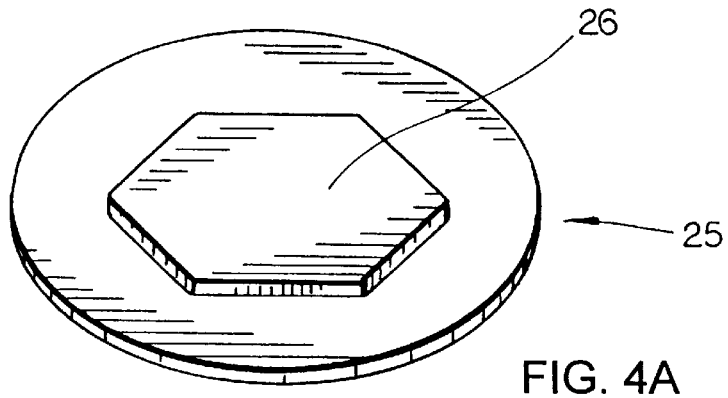
FIG. 4 presents perspective views each illustrating an embodiment of the cap according to the present invention.
Figure 4B:
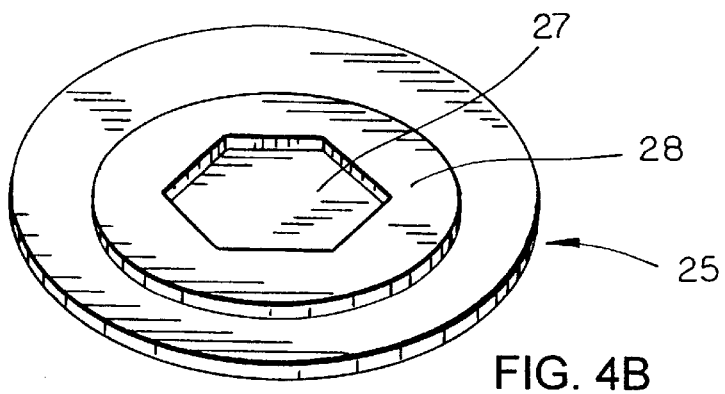
Figure 4C:
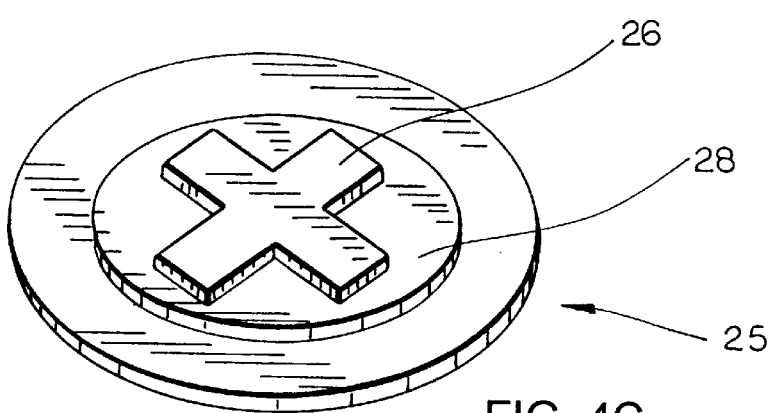
Figure 4D:
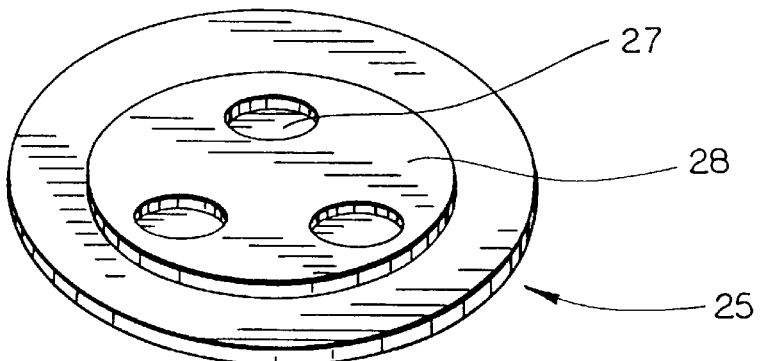

The cap 25 illustrated in FIG. 4(A) is formed with a regular-hexagonal protruding portion 26 at its central part. The cap 25 illustrated in FIG. 4(B) is formed with a regular-hexagonal recessed portion 27 at a substantially central part of its circularly protruding truncated cylinder portion 28. The cap 25 illustrated in FIG. 4(C) is formed with a protruding portion 26 shaped like a cross-shaped polygon on its circularly protruding truncated cylinder portion 28. The cap 25 illustrated in FIG. 4(D) is formed with a plurality of circular recessed portions 27 in its circularly protruding truncated cylinder portion 28. Each of the above-mentioned caps 25 has a protruding portion 26 or recessed portion 27 of a shape other than a true circle and having the same center as the center of rotation of the cap. Since the cap 25 is formed by performing plastic working of a metal plate, the shape of the cap 25 can be modified into any suitable shape by merely changing the configuration of the relevant die. In other words, it is not particularly necessary to add unnecessary steps when manufacturing the cap 25. Also, the shape of the protruding portion 26 or recessed portion 27 can be modified into various shapes such as polygons including triangular, elliptical and, further, star shapes, in addition to the shapes illustrated in FIG. 4 so long as it is other than a true circle having the same center as the center of rotation of the cap 25.

With one of the above-mentioned caps 25 being fixed in such a manner as to cover the open end 29 of the inside opening of the hub 20, a rotation stopper jig, not illustrated, is engaged with the protruding portion 26 or recessed portion 27 of the cap 25 when placing the discs D on the hub 20 and fixing the discs D by means of the clamper 1 7. The rotation of the hub 20 can be easily stopped by such engagement. Particularly, in a case where the protruding portion 26 or recessed portion 27 is regular-polygonal, there exists a plurality of engagement positions where it is engaged by the rotation stopper jig with the result that the fixing operation becomes easier to perform.

Figure 3:
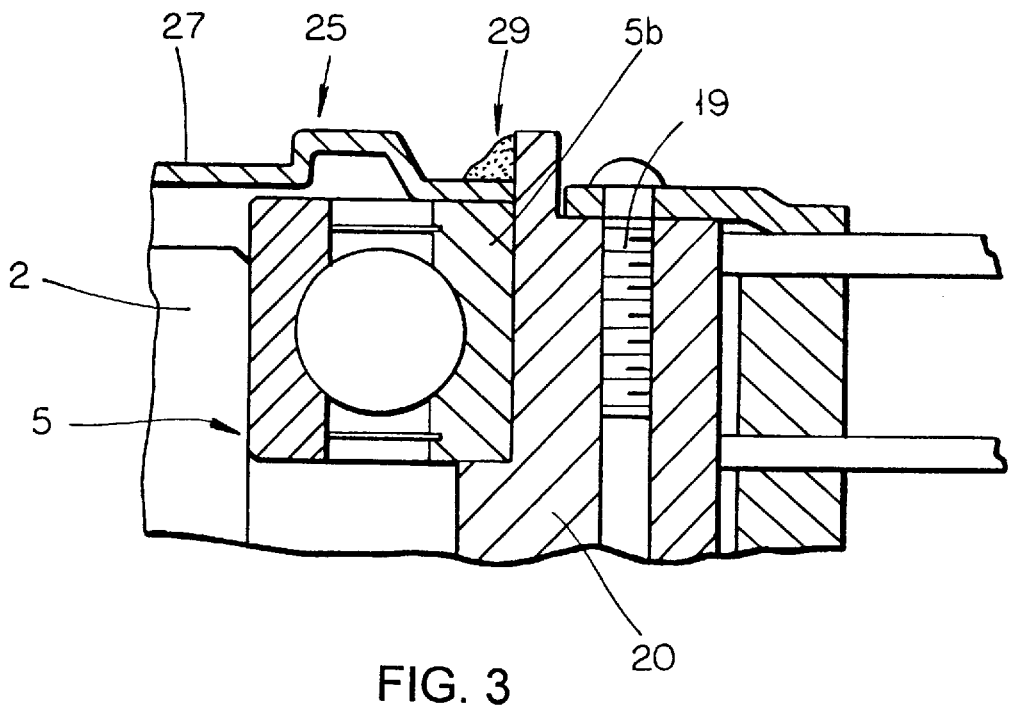
FIG. 3 is a sectional view of essential components of a disc drive motor according to another embodiment of the present invention.
Figure 5:
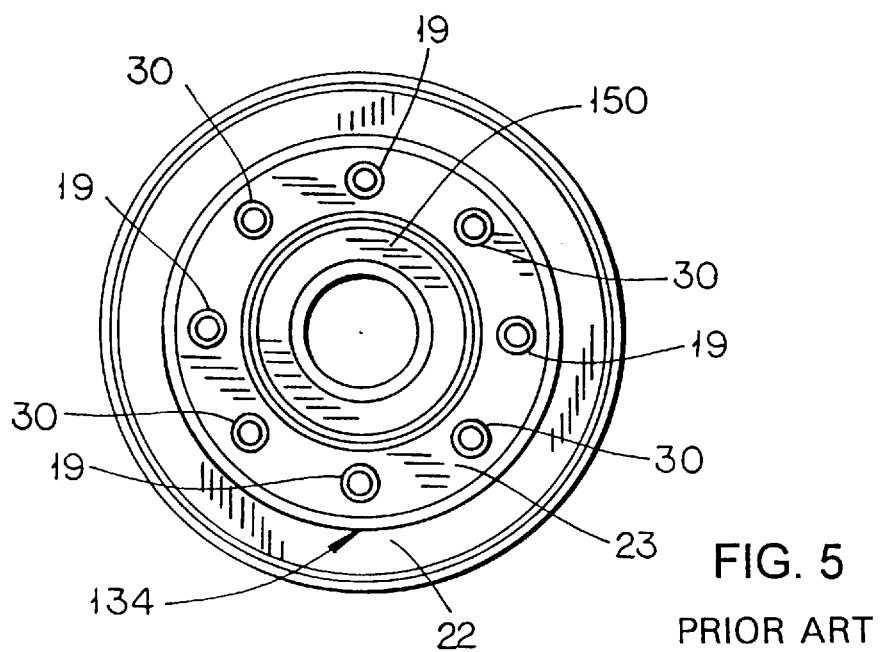
FIG. 5 is a plan view illustrating the conventional disc drive motor.

While in FIGS. 1 and 2 there has been illustrated a case where the protruding portion 26 is provided on the cap 25, the recessed portion 27 may conversely be provided inside the cap 25. FIG. 3 is an enlarged sectional view of an essential portion of the mode of embodiment connected therewith. The cap 27 secured to the open end 29 of the inside opening of the hub is caused to rise in the form of a true circle from the outer ring 5b of the ball bearing 5 and then is caused at its central part to protrude toward the fixed shaft 2, thereby forming a recessed portion 27. The shape of the inner periphery of this recessed portion 27 may be a shape such as that illustrated in FIGS. 4(B) and 4(D), namely, one of various shapes other than a true circle having the same center as the center of rotation of the relevant cap.

As mentioned above, since the protruding portion 26 or recessed portion 27 which, when clamping the discs, is engaged by the rotation stopper jig to stop the rotation of the hub 20, has been provided with respect to the cap 25, there is no need to form the jig engagement holes in the hub 20, unlike the conventional techniques. Accordingly, as illustrated in FIG. 2, only the clamping screw holes 19 are formed in the upper end surface 23 of the hub 20.

As described above, since the protruding or recessed portion of a shape other than a true circle having the same center as the center of rotation of the cap has been provided in this cap, the rotation of the hub can be easily stopped by merely engaging the rotation stopper jig and the protruding or recessed portion when clamping the discs. In addition, since it is not necessary to provide the jig engagement holes in the upper end surface of the hub, no cost is incurred for forming such jig engagement holes. This makes it possible to provide a disc drive motor equipped with an inexpensive hub. Particularly, in a case where the protruding or recessed portion is formed into a regular polygon shape, since the rotation stopper jig is engaged therewith at a plurality of engagement positions, the disc fixing operation becomes much easier to perform.

While the foregoing description and drawings represent the preferred embodiments of the present invention, it will be obvious to those skilled in the art that various changes and modifications may be made therein without departing from the true spirit and scope of the present invention.

What is claimed is:

1. A disc drive motor, comprising:

a fixed shaft;

a ball bearing fitted onto the fixed shaft;

a cylindrical hub rotatably supported by the ball bearing, said shaft being disposed within and at a center of said hub;

a clamper secured to said hub for fixing a disc to said hub;

a cap secured to said hub so as to fully cover one open end of an opening portion of the hub and to fully cover one end of said fixed shaft; and engagement means formed in said cap at a position directly over a center of said one end of said fixed shaft fully covered by said cap for engagement with a rotation stopper jig in order to stop rotation of the hub.

2. The disc drive motor of claim 1, wherein said engagement means is a single non-circular shaped recess or protrusion within said cap adapted to receive a non-circular shaped rotation stopper jig.

3. The disc drive motor of claim 2, wherein said non-circular shaped recess or protrusion is located at a center of rotation of said hub.

4. The disc drive motor of claim 1, wherein said clamper and said cap are not in contact with one another.

* * * * *